(12) United States Patent
Greenwood et al.

(10) Patent No.: US 6,389,787 B1
(45) Date of Patent: May 21, 2002

(54) OPTICAL FIBER RIBBON TWISTING DEVICE AND SYSTEM FOR USE IN THE MANUFACTURE OF FIBER OPTIC CABLE COMPONENTS

(75) Inventors: Jody L. Greenwood; David H. Smith; David K. Brittain, all of Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/726,929

(22) Filed: Nov. 30, 2000

(51) Int. Cl.[7] .................................................. D07B 1/06
(52) U.S. Cl. ............................................. 57/66; 57/138
(58) Field of Search ...................... 57/66, 138; 385/114

(56) References Cited

U.S. PATENT DOCUMENTS

| | | | |
|---|---|---|---|
| 3,382,314 A | * 5/1968 | Nordblad | 174/34 |
| 4,237,687 A | * 12/1980 | De Vecchis | 57/361 |
| 4,765,130 A | 8/1988 | De Varennes | 57/59 |
| 4,805,392 A | 2/1989 | Seveso et al. | 57/6 |
| 5,348,586 A | 9/1994 | Temple, Jr. et al. | 118/405 |
| 6,237,316 B1 | * 5/2001 | Saito et al. | 57/314 |
| 6,256,439 B1 | * 7/2001 | Brown et al. | 385/114 |

* cited by examiner

*Primary Examiner*—Andy Falik
(74) *Attorney, Agent, or Firm*—Timothy J. Aberle

(57) ABSTRACT

A method of forming an optical fiber cable component including passing an optical fiber ribbon stack (18) through a stack guide (31), the stack guide being rotated and forming a twist in the ribbon stack, and passing the twisted ribbon stack (18') through a cross-head (40) and extruding a material thereover. In addition, an exemplary cable component production line having a rotatable strander (12) for receiving optical fiber ribbon packages (14) thereon, a rotatable closing die (30) sized to receive the optical fiber ribbon stack, and controller (20) operatively associated with the strander and the closing die for driving the closing die, the controller being operative to effect a predetermined rotational ratio with respect to the strander and the closing die whereby a twist can be formed in the optical fiber ribbon stack.

19 Claims, 4 Drawing Sheets

OPTICAL FIBER RIBBON TWISTING DEVICE AND SYSTEM FOR USE IN THE MANUFACTURE OF FIBER OPTIC CABLE COMPONENTS

The present invention relates to an optical fiber ribbon twisting device and system for use in the manufacture of fiber optic cables and, more particularly, to a rotatable closing die and a system that uses the same.

Fiber optic cables include at least one optical fiber that can be disposed in a common matrix coating with other optical fibers defining an optical fiber ribbon. Optical fiber ribbons can be formed into a twisted stack for allowing ease of cable bending and maintaining integrity of the ribbon stack. Optical fiber ribbon pay-off devices, for example stranders, are typically used to define a twisted stack, the twist including a lay length or period of twist.

A strander typically includes spools of optical fiber ribbons, which spools are commonly termed packages. Packages can be mounted to a rotating carriage of the strander. In a typical optical ribbon stack manufacturing process, optical fiber ribbons are paid off the packages and directed to a pre-wet closing die, as disclosed in U.S. Pat. No. 5,348,586. The optical fiber ribbons are collected in a closing die that is shaped to receive the stacked ribbons, which shape is typically that of a generally rectangular orifice. Because the journal is mechanically coupled to the strander, the stack is twisted by rotation as it exits the closing die. The next step can be extrusion of a plastic tube about the twisted stack. However, several problems exist with the conventional method. For example, the stack may be misaligned with respect to the tube, variation in ribbon lay length can occur, and monitoring of excess ribbon length may be difficult.

The general concept of collecting cable components with a closing die is conventionally known. For example, U.S. Pat. No. 4,765,130, incorporated by reference herein, discloses a method and apparatus for making a cable core with cable core units stranded together while drawing the cable core units along a passline through a closing die and while vibrating the closing die. Vibration of the closing die is intended to facilitate movement of insulated conductors of the cable core units over one another to provide a greater and more uniform packing density of conductors in the resulting cable core. For example, a typical 3600 pair cable is made by stranding together 36 cable core units, each of which comprises 100 individually twisted pairs of insulated conductors stranded together to form a 100 pair cable core unit. During manufacture, the cable core units are passed through a closing die to ensure that the resulting cable core has a uniform diameter and shape. Some insulated conductors do not readily slide over one another during the stranding operation and this can limit the minimum size of closing die that can be used. Consequently, the resulting cable core diameter may be larger than is desired. Moreover, because the insulated conductors do not readily slide over one another the packing density of the conductors may be non-uniform. The solution involves stranding the cable units along a passline through the closing die; and simultaneously vibrating the closing die to compact the stranded elements together.

Other closing die applications are known. U.S. Pat. No. 4,805,392, incorporated by reference herein, describes manufacture of an optical fiber cable in which optical fibers are paid out from packages and inserted into the grooves of a cable core member by means of an inserting head. The core grooves are in the form of an open helix. A photoelectric system is disposed between the packages and the inserting head to provide signals indicating the position of the optical fibers advancing from the packages. A control device is connected to the photoelectric system and is designed to be responsive to the signals generated therefrom to control the speed at which the optical fibers are paid off from the packages. The optical fibers pass through a stationary closing device having holes in a flange fixed on a rigid tubular body through which the grooved core passes. An insertion head, downstream of the rigid tubular body, inserts the optical fibers into the grooves of the core.

The foregoing devices and systems address the need for closing devices in cable manufacture, but do not directly address the problems associated with cable components having at least one optical fiber ribbon therein, in particular, optical fiber ribbons formed into a twisted stack prior to extrusion of a tube thereover. Stationary dies can contribute to undesirable variations in ribbon lay length.

SUMMARY OF THE INVENTION

The present invention involves a cable component production line having a rotatable strander for receiving optical fiber ribbon packages thereon; a rotatable closing die sized to receive an optical fiber ribbon stack; and a controller operatively associated with the strander and the closing die for controlling rotation of the closing die, the controller being operative to effect a predetermined rotational ratio between the strander and the closing die whereby a twist can be formed in the optical fiber ribbon stack.

In another aspect, the present invention involves a cable component production line having a rotatable strander for receiving optical fiber ribbon packages thereon, the strander including a closing die coupled to the strander as a source of rotation that at least partially extends into or is proximate a portion of a cross-head containing a grease compound; and a controller operatively associated with the strander, the controller being operative to effect rotation of the strander whereby a twist is formed in the optical fiber ribbon stack within or proximate the the cross-head.

The present invention also contemplates a method of forming an optical fiber cable component employing a strander paying off optical fiber ribbons formed into a stack, the method having the steps of passing an optical fiber ribbon stack through a stack guide independently rotated relative to the strander, forming a twist in the ribbon stack, and passing the twisted ribbon stack through a cross-head and extruding a material thereover.

In another aspect the present invention involves a rotatable closing die for use with optical cable components, the closing die having a stack guide not mechanically coupled to a strander having a ribbon stack aperture therein; and a drive member for rotatably driving the stack guide, whereby rotation of the drive member causes the stack guide to rotate and form a twist in the ribbon stack.

DETAILED DESCRIPTION OF THE INVENTION(S)

Figure 1:
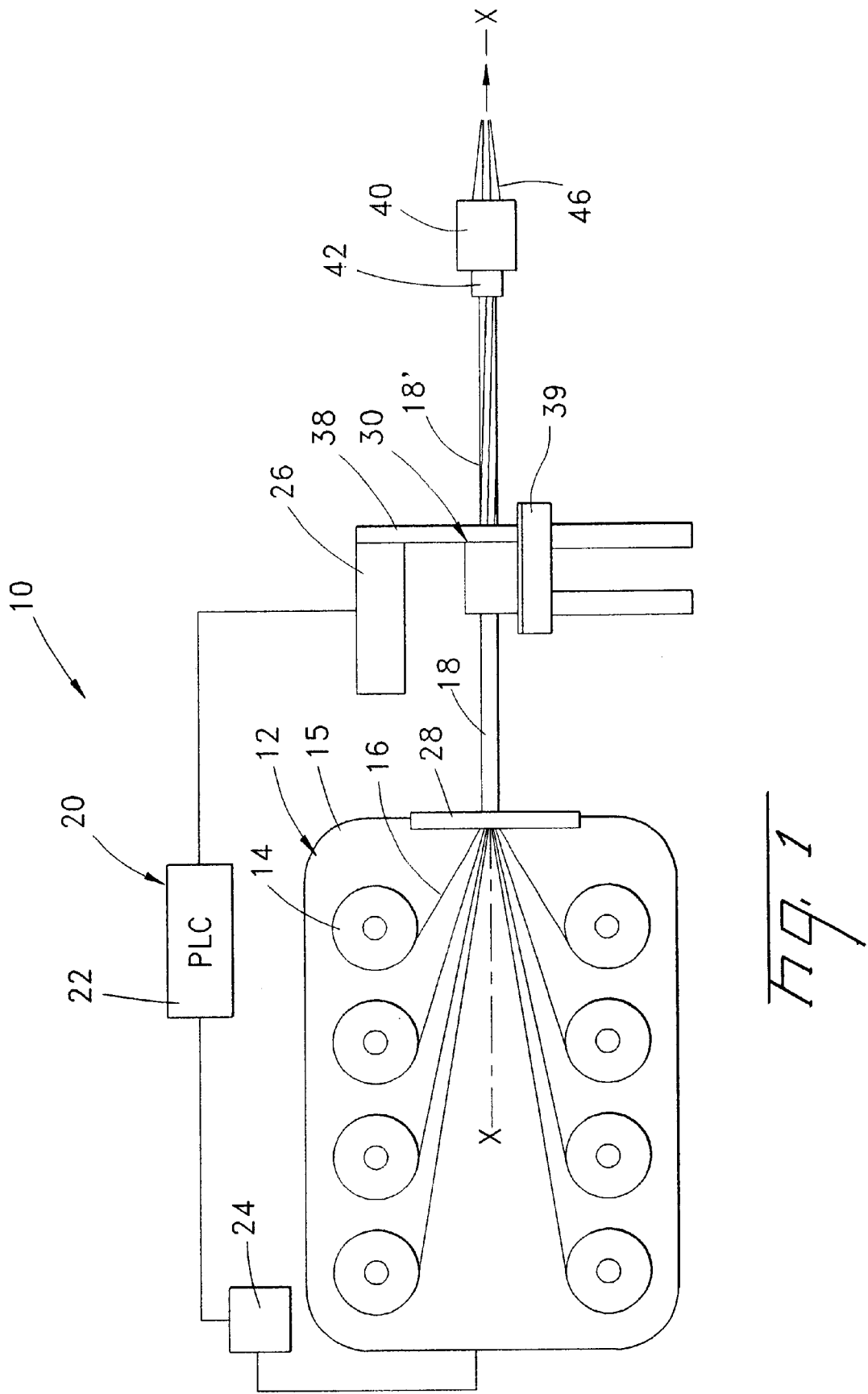
FIG. 1 is a schematic view of a fiber optic cable production line including a rotatable closing die system according to the present invention.

Referring to FIG. 1, an exemplary cable component production line 10 according to the present inventions will be described. In the preferred embodiment, production line 10 produces a twisted stack of optical fiber ribbons. Production line 10 comprises a production line axis X—X and includes an optical ribbon strander 12, a control system 20, and a rotatable closing die that in the preferred method of use is a rotating closing die 30. In the preferred method of use, production line 10 includes a pre-wet closing die 28 and produces a twisted stack of optical fiber ribbons that is fed into a cross-head 40 attached to an extrusion machine (not shown). Within cross-head 40, melt supplied from the extruder is shaped into a plastic tube 46 that is formed about the optical fiber ribbon stack.

In a preferred embodiment, optical ribbon strander 12 includes optical fiber ribbon packages 14 mounted to a rotatable frame 15. Packages 14 pay-off single optical fiber ribbons 16 toward pre-wet closing die 28. Pre-wet closing die 28 is preferably of the type described in U.S. Pat. No. 5,348,586, incorporated by reference herein, for applying a viscous substance to the optical fiber ribbons. In the preferred embodiment, control system 20 includes, for example, a programmable logic controller (PLC) 22 or a motion controller that interfaces with variable speed motors 24 and 26. A preferred function of the PLC or motion controller is based on electronic gearing, that is, the PLC or motion controller to accepts position input from the two motors and generates an appropriate control signal for the closing die motor. Motor 24 is mechanically associated with strander 12 for rotationally driving the strander, and motor 26 is mechanically associated with closing die 30 for rotationally driving the closing die.

Figure 2:
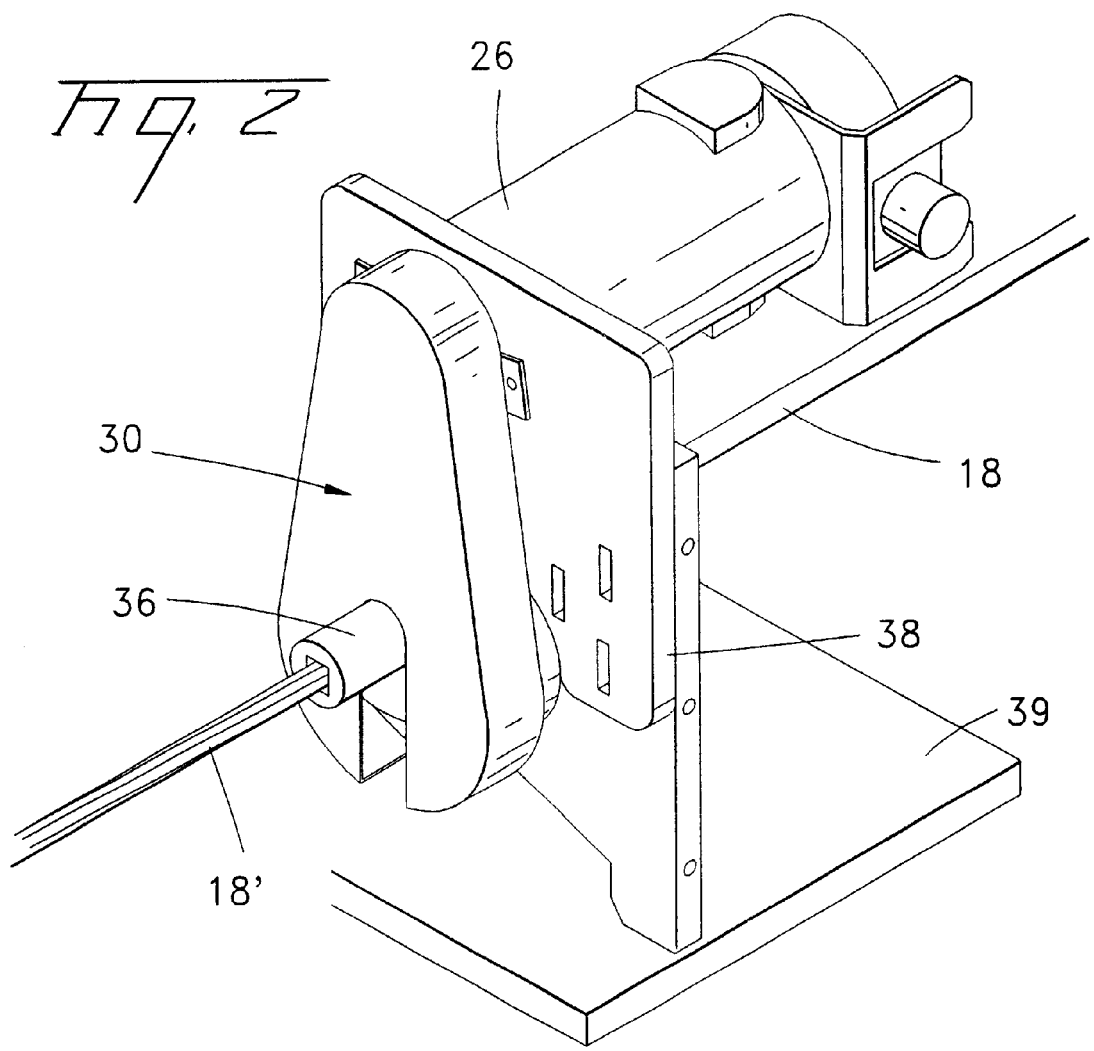
FIG. 2 is an isometric view of a rotatable closing die device according to the present invention.
Figure 3:
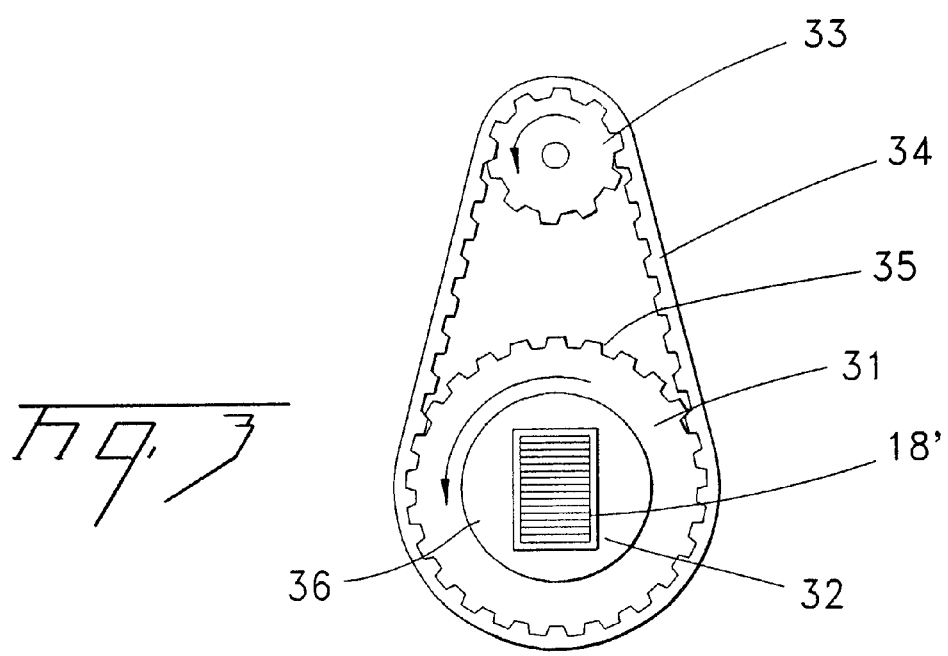
FIG. 3 is a schematic view of a portion of the closing die device of FIG. 2.

Rotating closing die 30 (FIGS. 2–3) includes a rotating stack guide 31, preferably not mechanically coupled to the strander, that includes a stack aperture 32 that is profiled to receive a stack of optical fiber ribbons 18. The stack aperture is preferably funnel shaped with a smooth finish. The stack aperture is preferably of a generally rectangular shape. Stack guide 31 includes a drive interface surface 35 that preferably has a surface that can interface with a belt or other suitable device for causing rotation of stack guide 31. As preferred for the embodiments shown in FIGS. 4–5, described in more detail hereinbelow, the stack guide comprises an extension 36 for disposition adjacent to or actually within the cross-head 40 or filling grease area 42 thereof. In the preferred embodiment, interface surface 35 is operatively associated with a drive member, for example, a drive pulley 33 through a motion connecting member, for example, a drive belt 34. Preferably, belt 34 is a toothed belt, for example, a rectangular profile timing belt. Rotating closing die 30 is mounted to a frame 38 that is mounted to an X–Y table 39. The frame 38 and X–Y table 39 provide suitable three dimensional adjustability for the rotating closing die. In other words, rotating closing die 30 is adjustably mounted so that aperture 32 can be properly aligned with line axis X—X. Proper alignment of closing die 30 with cross-head 40 improves the production process in that variations in extruded tube diameter and ribbon lay length are minimized, and stack integrity is preserved.

In an exemplary production process, control system 20 controls the operation of strander 12 and rotating closing die 30 via motors 24 and 26, respectively. Controller 22 is programmed to drive rotating closing die 30 at as close to about a 1:1 rotational ratio with the strander as possible, for example, a 1:0.95 rotational ratio. In other words, the strander and the closing die rotate at essentially the same speeds, preferably with no change in the ribbon lay length. The essentially 1:1 rotational ratio is preferably accomplished by electronic gearing, as a function of the motion controller, with integer gear ratios. Encoders respectively associated with rotating devices 12,30 are operative to send electronic pulses to PLC 22, and this input is used to control the speeds of the motors so that an essentially 1:1 rotational ratio exists. Any error is constantly corrected by the motion controller, thereby avoiding accumulated error. In this way, the lay length of the twisted ribbon will be preserved after the stack leaves the closing die and as it enters the cross-head. As ribbon stack 18 exits closing die 30, it is twisted into a suitably twisted ribbon stack 18'. Preferably, essentially no twist exists prior to the closing die; however, some twist may exist. Next, twisted ribbon stack 18' is moved into cross head 40.

Figure 4:
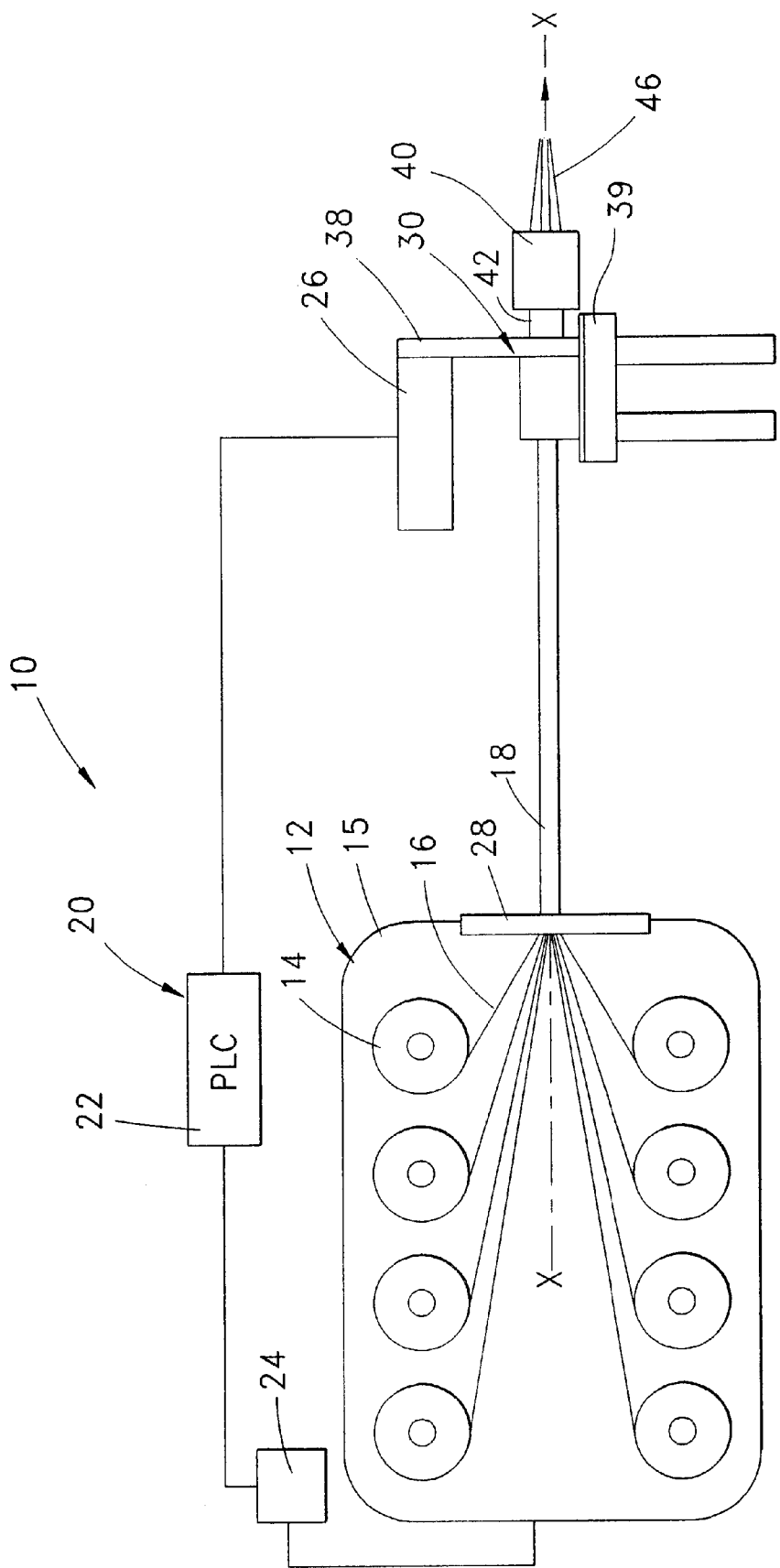
FIG. 4 is a schematic view of another embodiment of the present invention.
Figure 5:
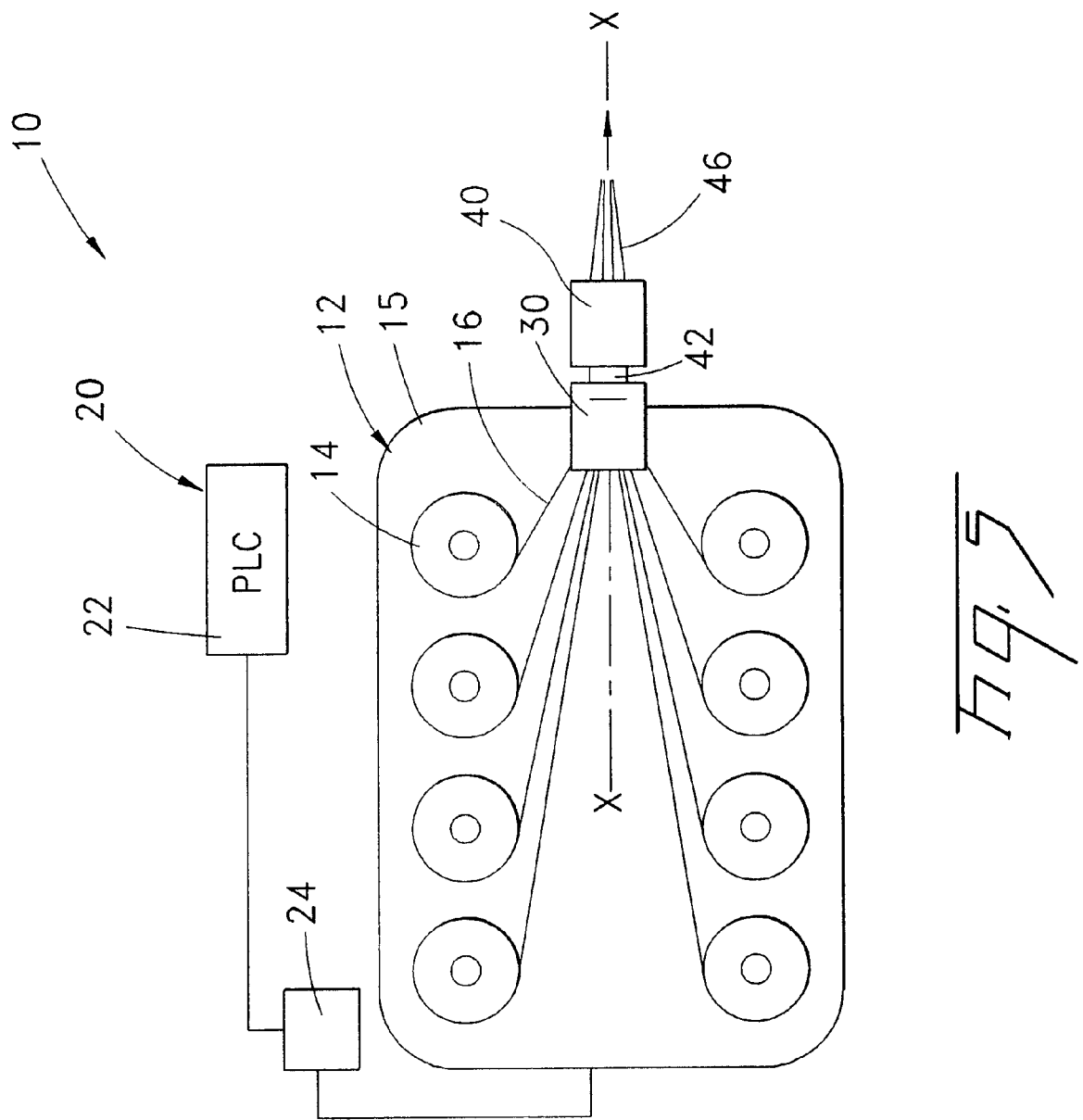
FIG. 5 is a schematic view of a further embodiment of the present invention.

In the preferred embodiment, cross head 40 includes a filling compound/grease containing area 42 for injecting a filling compound about the stack. Next, a plastic tube 46 is extruded about twisted ribbon stack 18 thereby forming a complete optical cable component including optical fiber ribbons, filling compound/grease, and a plastic tube. The embodiments of FIGS. 4 and 5 illustrate the concept of having an extension of the closing die adjacent or most preferably extending into the cross-head. This allows direct insertion of the ribbon stack 18' into the grease flow within or proximate the cross-head. In the preferred embodiment (FIG. 4) extension 36 extends into cross-head 40 or grease containing area 42. In the embodiment of FIG. 5, an extension 36 is formed on a closing die 30 that is mechanically coupled to the strander as a source of rotation. Strander 12 is preferably mounted to an adjustable frame for alignment of ribbon stack 18 with the cross-head 40. The adjustability of the closing die avoids mis-alignment of the stack with respect to the extruded tube, variation in ribbon lay length is avoided by the closing die and ribbon strander having an essentially 1:1 rotational ratio.

The present invention has thus been described with reference to the foregoing embodiments, which embodiments are intended to be illustrative of the inventive concepts rather than limiting. Skilled artisans will appreciate that variations and modifications of the foregoing embodiments may be made without departing from the scope of the appended claims. For example, although the invention has been described with reference to electronic gearing, other control systems can be used, for example, electronic registration or mechanical gearing alternatives can achieve a suitable rotational ratio as well. Stack guide 31 can be driven by friction belts, direct gearing, pneumatic means, cams, other components.

Accordingly, what is claimed is:

1. A cable component production line, comprising:
   a rotatable strander for receiving optical fiber ribbon packages thereon;
   a rotatable closing die sized to receive an optical fiber ribbon stack; and
   a controller operatively associated with said strander and said closing die for controlling rotation of said closing die, said controller being operative to effect a predetermined rotational ratio between said strander and said closing die whereby a twist can be formed in said optical fiber ribbon stack.

2. The cable component production line of claim 1, a pre-wet device being interposed between said strander and said closing die.

3. The cable component production line of claim 1, said predetermined rotational ratio being about 1:1.

4. The cable component production line of claim 1, said closing die being mounted to an adjustable frame.

5. The cable component production line of claim 1, said closing die comprising a stack guide.

6. The cable component production line of claim 5, said stack guide having a stack aperture therein for receiving said optical fiber ribbon stack.

7. The cable component production line of claim 5, said stack guide being operatively associated with a drive pulley.

8. The cable component production line of claim 5, said stack guide comprising a drive interface surface.

9. The cable component production line of claim 1, said closing die being spaced from a cross-head device.

10. The cable component production line of claim 1, a portion of said closing die extending into a cross-head device, wherein said optical fiber ribbon stack is twisted within said cross-head device.

11. A cable component production line, comprising:
a rotatable strander for receiving optical fiber ribbon packages thereon, said strander including a closing die coupled to said strander as a source of rotation that at least partially extends into or is proximate a portion of a cross-head containing a grease compound; and
a controller operatively associated with said strander, said controller being operative to effect rotation of said strander whereby a twist is formed in said optical fiber ribbon stack within or proximate said portion of said cross-head.

12. The cable component production line of claim 11, said strander being mounted to an adjustable frame.

13. The cable component production line of claim 11, said closing die having a stack aperture therein for receiving said optical fiber ribbon stack.

14. A method of forming an optical fiber cable component employing a strander paying off optical fiber ribbons formed into a stack, comprising:
passing an optical fiber ribbon stack through a stack guide independently rotated relative to said strander, passing the ribbon stack through a pre-wet device, and forming a twist in said ribbon stack; and
passing said twisted ribbon stack through a cross-head and extruding a material thereover.

15. The method of claim 14, at least a portion of a closing die extending into said cross-head so that said ribbon stack is twisted within said cross-head.

16. A rotatable closing die for use with optical cable components, comprising:
a stack guide not mechanically coupled to a:strander having a ribbon stack aperture therein; and
a drive member for rotatably driving said stack guide, whereby rotation of said drive member causes said stack guide to rotate and form a twist in said ribbon stack; said rotating closing die being mounted to a frame that is mountable to an X–Y table.

17. The rotatable closing die of claim 16, said stack guide including a drive interface surface.

18. The rotatable closing die of claim 17, said drive interface surface having a profile for interfacing with a motion connecting member.

19. The rotatable closing die of claim 18, said motion connecting member comprising a toothed belt.

* * * * *